United States Patent
Aoki (10) Patent No.: US 7,261,372 B2
(45) Date of Patent: Aug. 28, 2007

(54) SEAT AIR CONDITIONER FOR VEHICLE

(75) Inventor: Shinji Aoki, Chiryu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/221,216

(22) Filed: Sep. 7, 2005

(65) Prior Publication Data

US 2006/0138812 A1 Jun. 29, 2006

(30) Foreign Application Priority Data

Dec. 24, 2004 (JP) ............................. 2004-373540

(51) Int. Cl.
*A47C 7/30* (2006.01)
*A47C 7/74* (2006.01)
(52) U.S. Cl. .................... 297/180.14; 297/180.13; 454/120; 454/907
(58) Field of Classification Search .......... 297/180.12, 297/180.13, 180.14; 454/120, 907
See application file for complete search history.

(56) References Cited

U.S. PATENT DOCUMENTS

| 5,924,766 | A | | 7/1999 | Esaki et al. | |
|---|---|---|---|---|---|
| 6,003,950 | A | * | 12/1999 | Larsson | 297/452.42 |
| 6,048,024 | A | * | 4/2000 | Wallman | 297/180.14 |
| 6,059,018 | A | * | 5/2000 | Yoshinori et al. | 165/42 |
| 6,062,641 | A | * | 5/2000 | Suzuki et al. | 297/180.1 |
| 6,179,706 | B1 | * | 1/2001 | Yoshinori et al. | 454/120 |
| 6,478,369 | B1 | * | 11/2002 | Aoki et al. | 297/180.13 |
| 6,578,910 | B2 | * | 6/2003 | Andersson et al. | 297/180.11 |
| 6,619,736 | B2 | * | 9/2003 | Stowe et al. | 297/180.14 |
| 6,736,452 | B2 | * | 5/2004 | Aoki et al. | 297/180.13 |
| 6,929,322 | B2 | * | 8/2005 | Aoki et al. | 297/180.14 |
| 2004/0198212 | A1 | | 10/2004 | Aoki et al. | |

FOREIGN PATENT DOCUMENTS

JP 2003165325 A * 6/2003

* cited by examiner

*Primary Examiner*—Joe Edell
(74) *Attorney, Agent, or Firm*—Harness, Dickey & Pierce, PLC (57) ABSTRACT

A seat air conditioner for a vehicle seat includes a blower unit which has a blower fan and an air discharge duct, a vibration isolation unit arranged between the blower unit and a cushion member of the seat, and an accordion duct which is arranged between the air discharge duct and an air passage defined in the cushion member. The blower unit is disposed at an opposite side to the cushion member with respect to seat spring members of the seat. Air blown by the blower fan flows toward a plurality of blowing-out openings formed at a surface cover member of the seat, through the air discharge duct, the accordion duct and the air passage formed in the cushion member.

12 Claims, 8 Drawing Sheets

SEAT AIR CONDITIONER FOR VEHICLE

CROSS REFERENCE TO RELATED APPLICATION

This application is based on a Japanese Patent Application No. 2004-373540 filed on Dec. 24, 2004, the disclosure of which is incorporated herein by reference.

FIELD OF THE INVENTION

The present invention relates to a seat air conditioner for a vehicle.

BACKGROUND OF THE INVENTION

Figure 8:
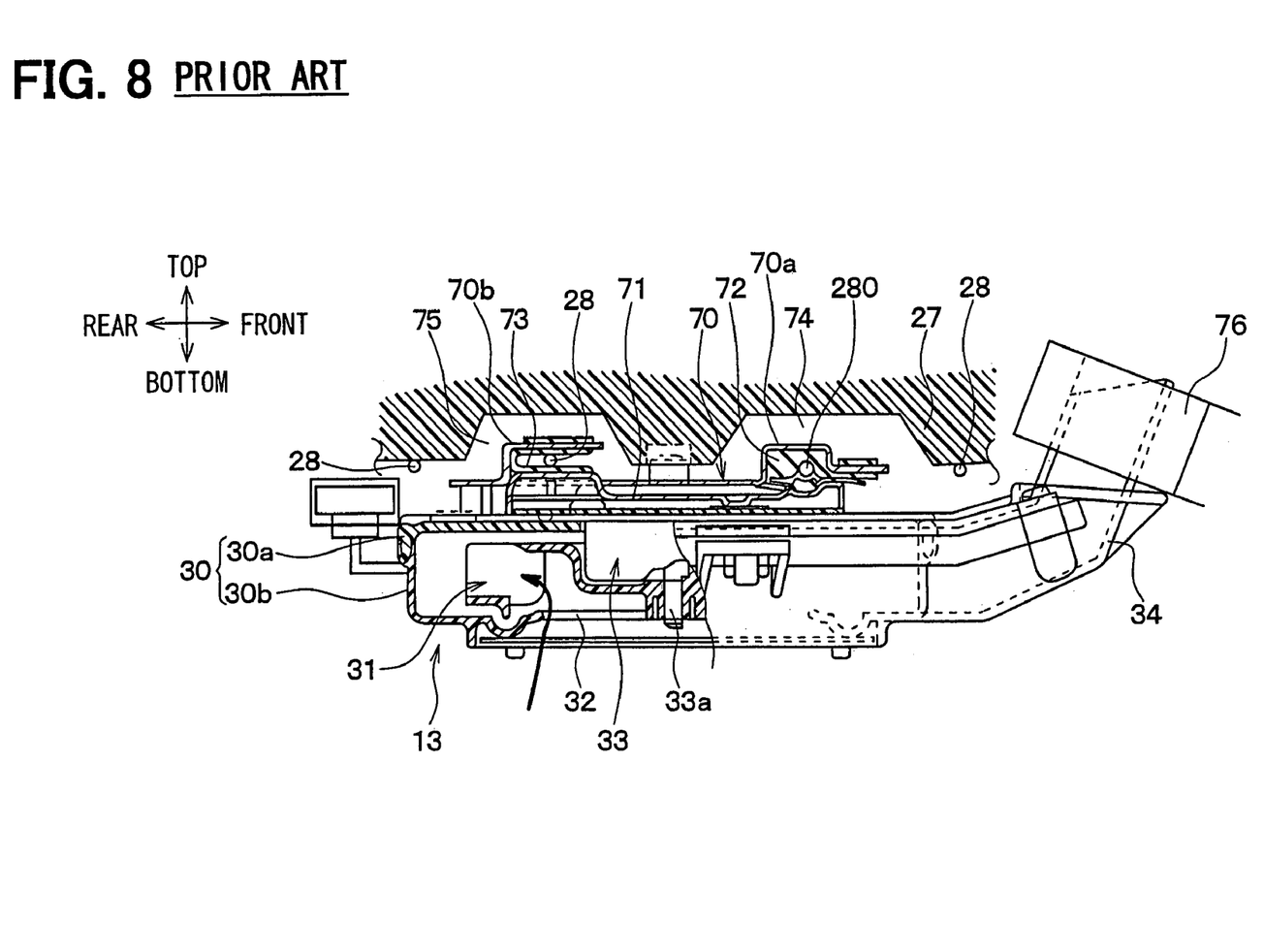
FIG. 8 is a partially cross-sectional view showing a mounting state of a blower unit at a seat according to a prior art.

In a seat air conditioner for a vehicle seat disclosed in U.S. 2004/0198212A1, referring to FIG. 8, vibration excited by a blower unit 13 is restricted from being transmitted to the side of the seat.

In this case, the blower unit 13 is arranged at the lower side of seat spring members 28 and 280, which are located at the lower side of a cushion member 27. The seat spring members 28 and 280 are arranged between a cover member 71 of the blower unit 13 and an attachment bracket 70 through resilient damper members 72 and 73, so that the vibration excited by the blower unit 13 is restricted from being transmitted to the side of the cushion member 27 through the seat spring members 28 and 280.

The cushion member 27 is provided with concave portions 74 and 75, in which protrusion pieces 70a and 70b of the attachment bracket 70 are respectively disposed with a predetermined gap therebetween. That is, the protrusion pieces 70a and 70b are restricted from contacting the cushion member 27.

A blower fan 31 of the blower unit 13 sucks inside air (i.e., air in passenger compartment of vehicle) through an air suction port 32, and blows the inside air into an air passage (not shown) of the cushion member 27 through an air discharge duct 34. Thus, the inside air is discharged from minute discharge openings formed at a surface member (not shown) of the seat. A cylindrical seal packing 76 is arranged at the end portion of the air discharge duct 34, to seal the joint between the air discharge duct 34 and the air passage of the cushion member 27.

In this case, the seat spring members 28 and 280, the cushion member 27 and the like will be displaced in the up-down direction responding to a passenger seating, a vehicle vibration and the like. Consequently, the blower unit 13 which is supported by the seat spring members 28 and 280 is displaced in the up-down direction, to have a relative displacement with respect to the seat spring members 28, 280 and the cushion member 27.

However, in this case, only the seal packing 76 is arranged at the joint between the end portion of the air discharge duct 34 and the air passage of the cushion member 27, to be unable to sufficiently absorb the relative displacement of the blower unit 13. Accordingly, a seal defect will be readily caused at the-end portion of the air discharge duct 34. Furthermore, the seal packing 76 that is made of a resin foam or the like has an inferior isolation effect for the vibration of the blower unit 13, as compared with that made of a rubber.

In the case where the resilient damper member 72, 73 is made of a rubber, the frequent deformations of the seat spring members 28 and 280 will cause a high attrition wear of the rubber material which has a large friction coefficient.

In the case where the resilient damper member 72, 73 is made of a felt, which has a smaller friction coefficient than the rubber, the attrition wear of the resilient damper member 72, 73 will be reduced. However, as compared with the rubber, the felt has an inferior vibration-isolating effect because of an inability to have a spring constant suitable for the frequency band of the vibration excited by the blower unit 13. Thus, the vibration isolation of the blower unit 13 will be deteriorated.

SUMMARY OF THE INVENTION

In view of the above-described and other disadvantages, it is an object of the present invention to provide a vehicle seat air conditioner, in which a transmission of vibration excited by a blower unit is restricted and an absorption of relative displacement of the blower unit with respect to seat spring members and a cushion member is improved. The blower unit is provided with a vibration-isolating support construction having a substantial endurance capacity.

According to an aspect of the present invention, a seat air conditioner is provided for a vehicle seat, which has a cushion member disposed at a backside of a surface cover member and resiliently supported by a plurality of seat spring members at a backside of the cushion member. The seat air conditioner includes a blower unit, a vibration isolation unit arranged between the blower unit and the cushion member of the vehicle seat, and an accordion duct. The blower unit has a blower fan and an air discharge duct, through which air blown by the blower unit flows. The blower unit is disposed at an opposite side of the cushion member with respect to the seat spring members. The accordion duct, being made of a rubber, is arranged in a joint between the air discharge duct and an air passage defined in the cushion member. Air in the air discharge duct flows through the accordion duct and the air passage toward a plurality of blowing-out openings formed at the surface cover member of the seat.

Because the accordion duct made of the rubber is arranged at the end portion of the air discharge duct, the accordion duct can absorb a relative displacement of the blower unit with respect to the seat spring member and the cushion member by the expansion and contraction of the accordion duct.

Moreover, the accordion duct made of the rubber has a satisfactory vibration-isolating effect, to restrict the vibration of the first blower unit from being transmitted to the cushion member through the air discharge duct.

According to another aspect of the present invention, a seat air conditioner is provided for a vehicle seat, which has a cushion member disposed at a backside of a surface cover member and resiliently supported by a plurality of seat spring members at a backside of the cushion member. The seat air conditioner includes a blower unit, a plurality of vibration-isolating coupler apparatuses, and a plurality of vibration-isolating resilient members. The blower unit is disposed at an opposite side of the cushion member with respect to the seat spring members. The blower unit has a blower fan for blowing air, a blower casing for rotatably accommodating the blower fan, a first bracket which is joined to the blower casing, and a second bracket which is arranged between the first bracket and the seat spring members. The vibration-isolating coupler apparatus has a vibration-isolating rubber member arranged between the first bracket and the second bracket. The vibration-isolating resilient member is arranged between the second bracket and the seat spring member. The blower fan blows air through an air passage defined in the cushion member toward a plurality of blowing-out openings formed at the surface cover member of the seat. The vibration-isolating resilient member is made of a resilient material having a smaller friction coefficient than a rubber.

Because the vibration-isolating resilient member made of the resilient material with the smaller friction coefficient than the rubber is arranged between the second bracket and the seat spring member, the attrition wear of the vibration-isolating resilient member due to the friction between it and the seat spring member can be reduced. Thus, the vibration-isolation resilient member can be restricted from becoming worn-out during a short period. Accordingly, the endurance capacity of the vibration-isolating support construction of the blower unit can be improved.

Moreover, because the vibration-isolating rubber member is arranged between the first bracket of the side of the blower unit and the second bracket of the side of the seat spring member, the vibration of the blower unit can be substantially restricted from being transmitted to the side of the seat spring member. Accordingly, both the vibration-isolating function and the endurance capacity of the vibration-isolating support construction of the blower unit can be satisfactorily maintained.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

Preferred Embodiment

A seat air conditioner for a vehicle according to a preferred embodiment of the present invention will be described with reference to FIGS. 1-7. The seat air conditioner can be attached to a vehicle seat 10 (e.g., driver seat or front-passenger seat).

Figure 1:
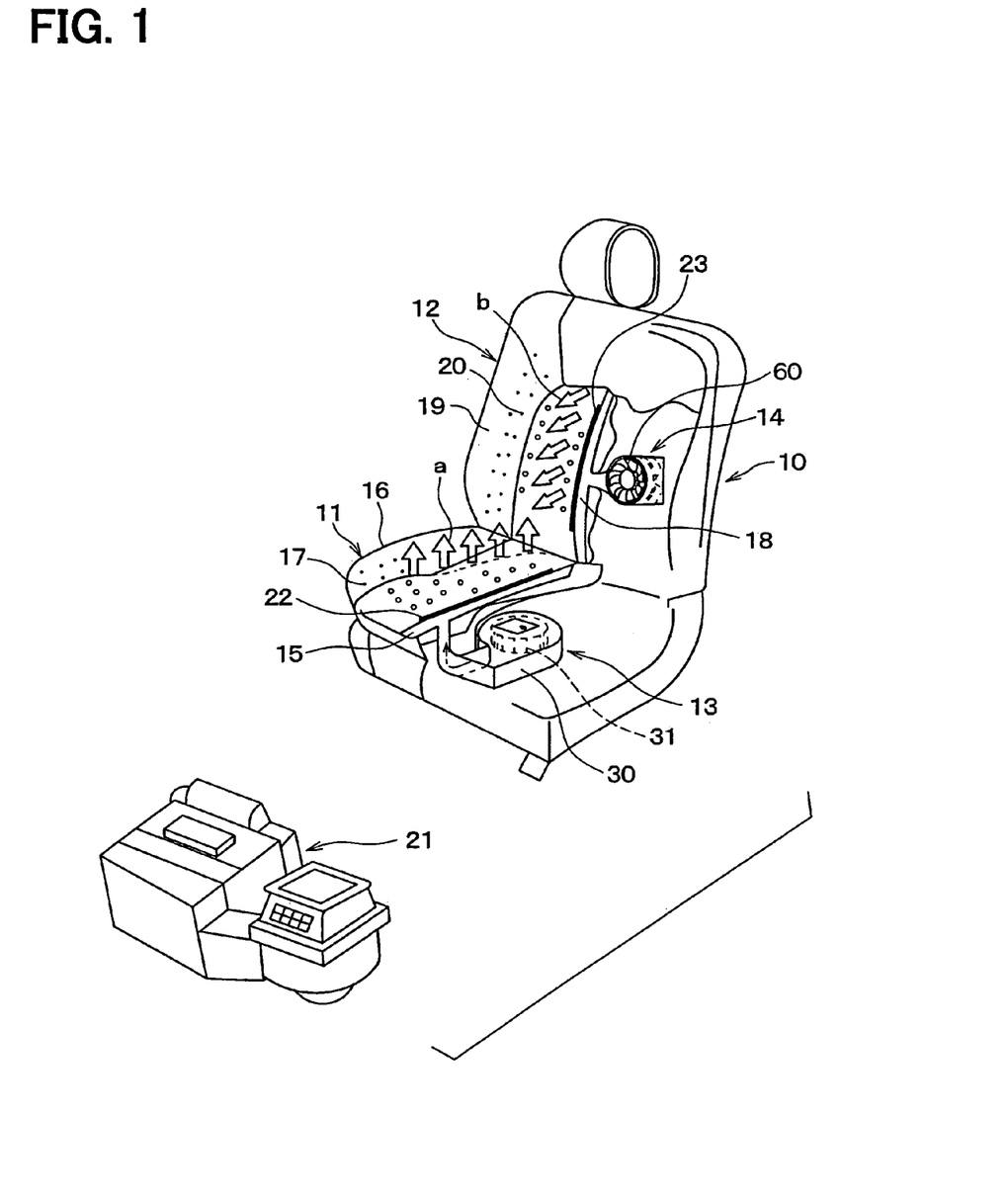
FIG. 1 is a perspective view showing a vehicle seat where a seat air conditioner is mounted according to a preferred embodiment of the present invention.

The seat 10 includes a seat cushion unit 11 contacting the buttocks of a passenger (not shown) seated on the seat 10, and a seat back unit 12 for supporting the back of the passenger. First and second blower units 13, 14 are respectively arranged in the seat cushion unit 11 and the seat back unit 12.

The first blower unit 13 (blower unit) draws air (inside air) in a passenger compartment of the vehicle from the lower side of the seat cushion unit 11, and blows the inside air having been drawn toward a surface cover member 16 of the seat cushion unit 11 through an air passage 15 formed in the seat cushion unit 11. Thus, as indicated by arrows "a" in FIG. 1, the inside air is discharged toward the body of the passenger through a plurality of blowing-out openings 17, which penetrate the surface cover member 16.

The second blower unit 14 draws air (inside air) in the passenger compartment from the back side (i.e., opposite side to passenger) of the seat back unit 12, and blows the inside air having been drawn toward a surface cover member 19 of the seat back unit 12 through an air passage 18 formed in the seat back unit 12. Thus, as indicated by arrows "b" in FIG. 1, the inside air is discharged toward the body of the passenger through a plurality of blowing-out openings 20, which penetrate the surface cover member 19.

The surface cover members 16 and 19 are respectively disposed at the outmost side of the seat cushion unit 11 and the seat back unit 12, and contact the passenger.

The first blower unit 13 is provided with a centrifugal blower fan 31, considering that the air passage of the first blower unit 13 has a-high pressure loss. On the other hand, a blower fan 60 of an axial-flow type is provided for the second blower unit 14, because the air passage of the second blower unit 14 has a low pressure loss. Each of the blower fans 31 and 60 is rotated by a drive motor (not shown), for example.

The vehicle is provided with a passenger-compartment air conditioning unit 21 for air-conditioning the passenger compartment. The passenger-compartment air conditioning unit 21 is arranged, for example, inside an instrument panel (not shown), which is located at the front portion of the passenger compartment. The passenger compartment is air-conditioned by the conditioned air blown by the passenger-compartment air conditioning unit 21. Thus, the first and second blower units 13, 14 can blow the conditioned air (i.e., inside air) in the passenger compartment toward the surface cover members 16 and 19 of the seat 10.

Electric heaters 22 and 23 are respectively arranged in the seat cushion unit 11 and the seat back unit 12, and respectively disposed at backsides of the surface cover members 16 and 19. The electric heater 22, 23 includes an electric resistance wire or the like, which is bent into a meander shape and widely extends to the surface cover member 16, 19. Thus, when the electric heater 22, 23 is energized in a heating operation in winter, warm air heated by the electric heater 22, 23 is discharged through the blowing-out openings 17, 20 of the surface cover member 16, 19. Moreover, the surface cover member 16, 19 itself is also heated.

Next, the mounting construction of the first blower unit 13 which is attached to the seat cushion unit 11 will be described with reference to FIGS. 2 to 7.

Figure 2:
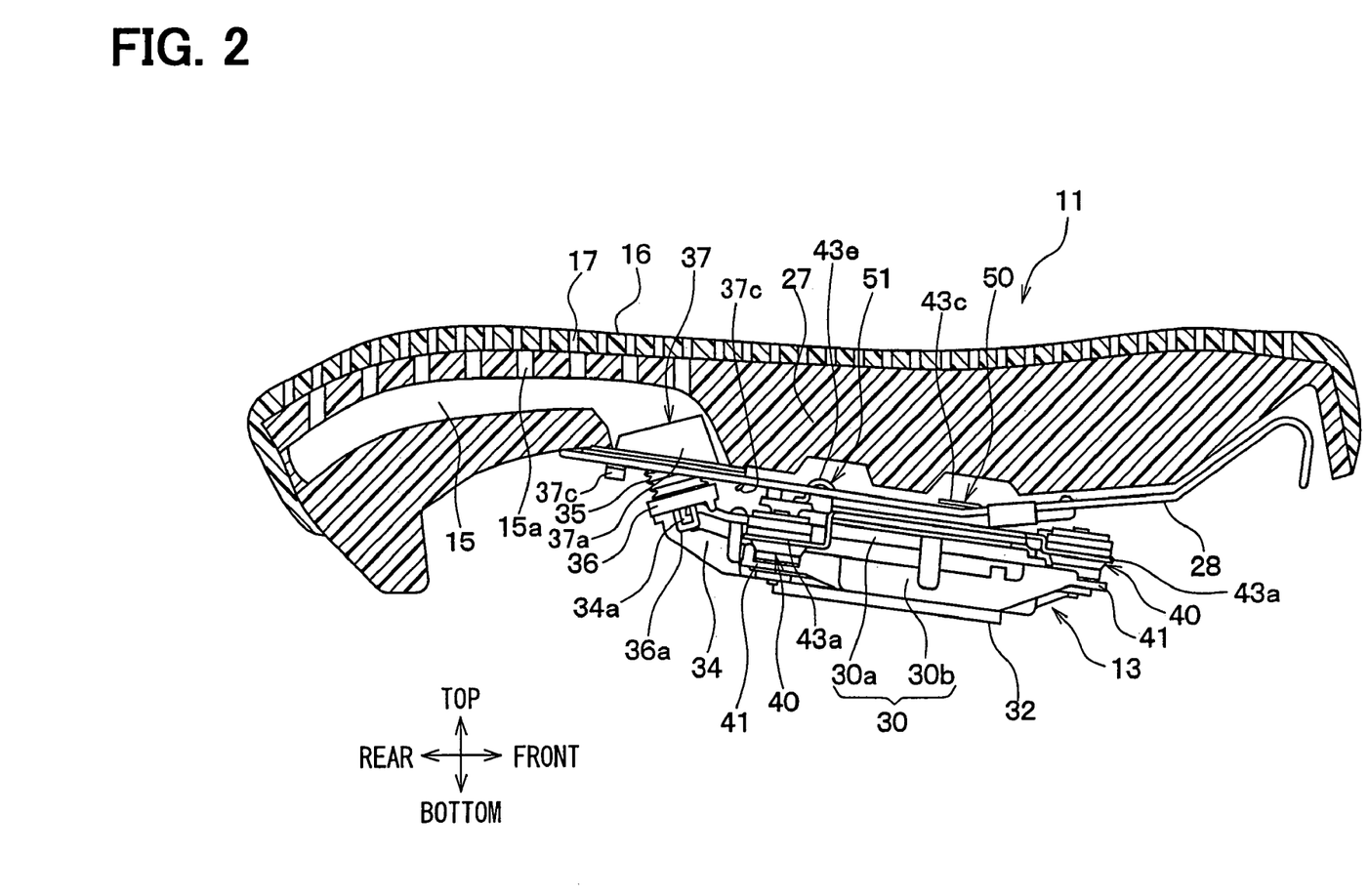
FIG. 2 is a partially cross-sectional view showing a seat cushion unit where a first blower unit is attached according to the preferred embodiment.

As shown in FIG. 2, the seat cushion unit 11 has a cushion member 27 which is disposed at the backside of the surface cover member 16, and multiple seat spring members 28 and 280 at the backside of the cushion member 27.

The surface cover member 16 is normally made of a leather or a fabric material for the sake of a good appearance. The cushion member 27 is made of a resiliently deformable material, such as a resilient resin material (e.g., open cell type polyurethane foam). A thickness of the cushion member 27 is larger than that of the surface cover member 16, and sufficient to mainly provide a cushioning performance for the seat 10. The electric heater 22 is arranged between the surface cover member 16 and the cushion member 27, and not shown in FIG. 2.

Figure 3:
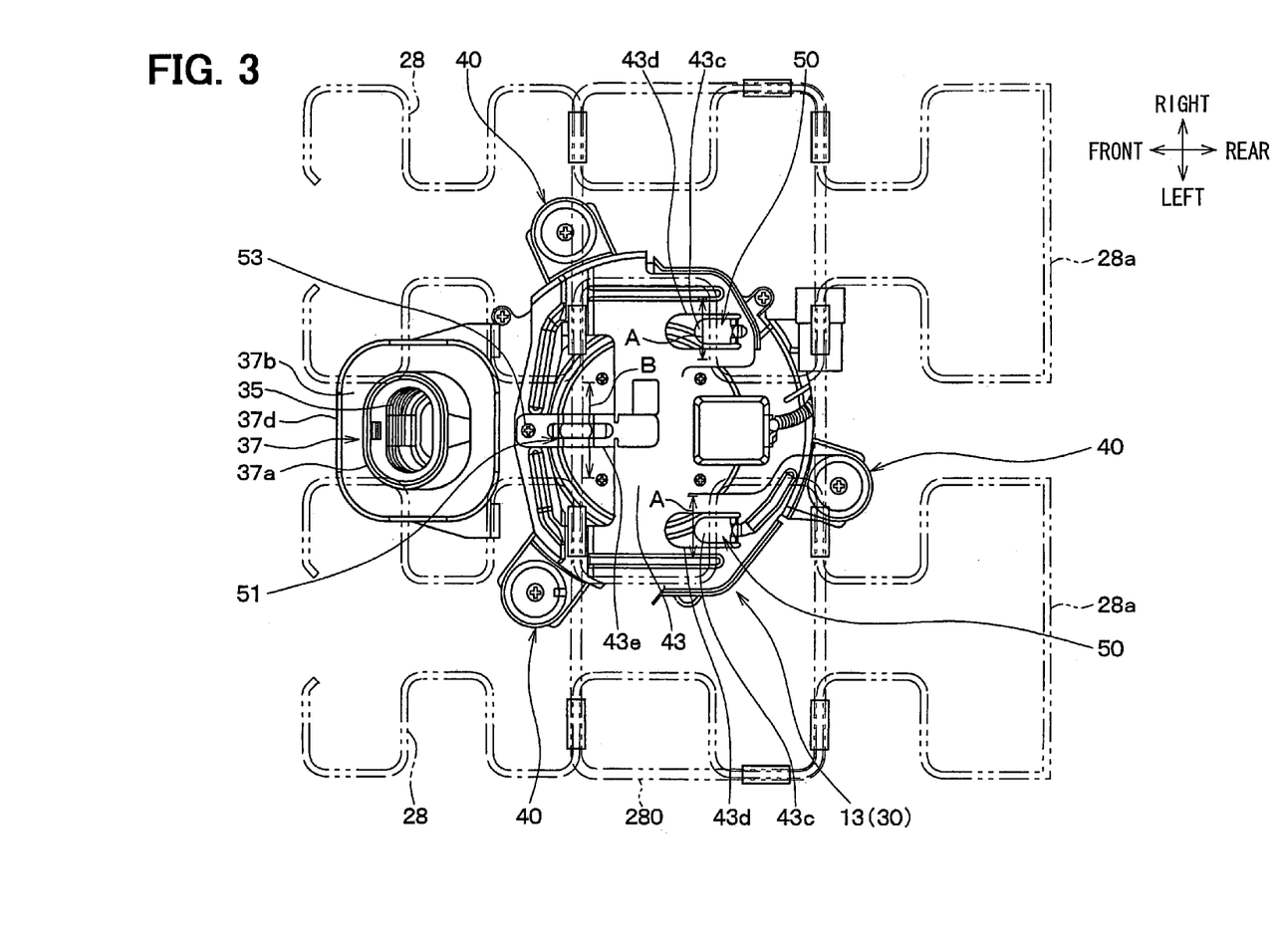
FIG. 3 is a plan view showing an arrangement relationship between the first blower unit and seat spring members according to the preferred embodiment.

Each of the seat spring members 28 (totaling to two, for example) can be a wire member, which is made of a spring steel and has a circular cross section, for example. The seat spring member 28 is located below the cushion member 27 in a manner shown in FIG. 3. The seat spring member 28 is bent to have a substantial "S" shape in the fore-aft direction of the vehicle, and has a U-turn portion 28a which is disposed at an end of the vehicle rear side of the seat spring member 28, as shown in FIG. 3.

The seat spring member 280 (totaling to one, for example) is arranged at a substantial center of the vehicle fore-aft direction of the seat spring member 28. Specifically, the seat spring member 280 has a substantially rectangular closed-loop shape, which has a longitudinal direction in the vehicle left-right direction. Two longitudinal-direction ends of the seat spring member 280 respectively overlap the center portions of the vehicle fore-aft direction of the two seat spring members 28. The seat spring member 280 is integrally connected with each of the seat spring members 28, for example, by crimping, at the overlap portion therebetween.

Two ends of the vehicle fore-aft direction of the seat spring member 28 are connected to and supported by a seat cushion frame (not shown). The seat cushion frame is made of a rigid metal material, and arranged as a frame body at the backside (lower side) of the cushion member 27. The seat cushion frame functions as a reinforcing member (skeletal member) for maintaining the shape of the seat cushion unit 11. Thus, the cushion member 27 and the like can be resiliently supported by the seat spring members 28 and 280 in a manner that allows displacements of the cushion member 27 and the like.

Figure 4:
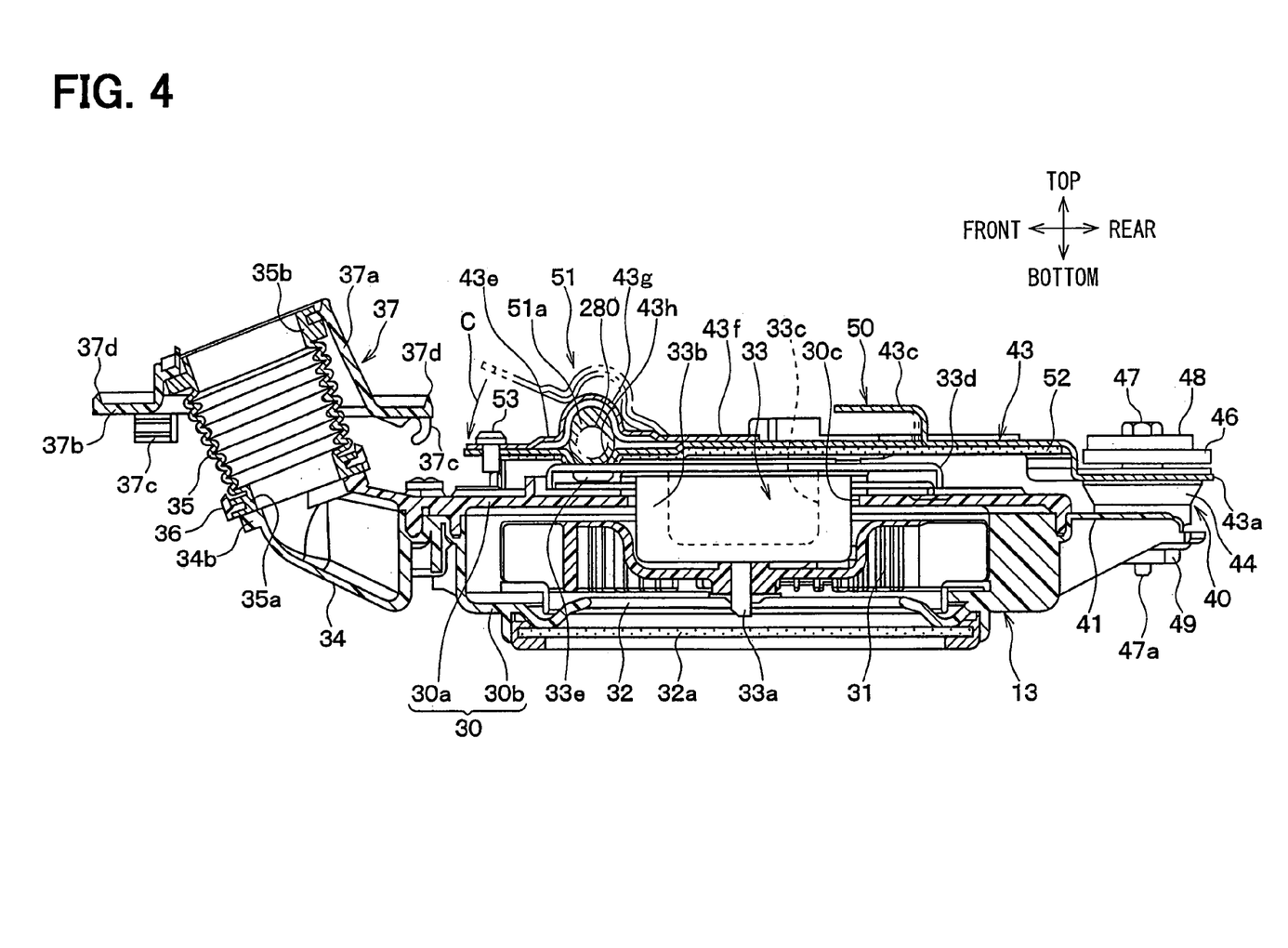
FIG. 4 is a partially cross-sectional view showing the first blower unit according to the preferred embodiment.

As shown in FIG. 4, the first blower unit 13 has a blower casing 30, in which the centrifugal blower fan 31 is rotatably accommodated. The blower casing 30 includes an upper casing portion 30a and a lower casing portion 30b, which are independently formed (e.g., by molding) and joined together by screwing, for example. Each of the upper casing portion 30a and the lower casing portion 30b can be made of a resin or the like.

The centrifugal blower fan 31 includes a plurality of blades, which are arranged to form a ring shape having an axial direction in the vehicle up-down direction. An air intake port 32 is formed at a bottom surface of the lower casing portion 30b of the blower casing 30, and arranged at the side of one axial end (i.e., end of vehicle lower side) of the centrifugal blower fan 31. Thus, air inside the passenger compartment can be drawn through the air intake port 32 from the space near the passenger compartment floor at the lower side of the seat cushion unit 11. The air intake port 32 is provided with a filter unit 32a for removing dust in air.

The center portion of the centrifugal blower unit 31 is fixedly joined to a rotation shaft 33a of a drive motor 33. The drive motor 33 is arranged at the side of the other axial end (i.e., end of vehicle upper side) of the centrifugal blower fan 31, and protrudes from the upper casing portion 30a through a central hole 30c, which penetrates an upper portion of the upper casing portion 30a.

The drive motor 33, being a brushless motor of an outer rotor type, has a rotor 33b which is integrally connected with the rotation shaft 33a, and a stator 33c which is arranged at the circumferentially inner side of the rotor 33b. The stator 33c is fixed to the upper casing portion 30a through an attachment flange 33d (having a circular plate shape) or the like, which is arranged at the upper portion of the stator 33c.

The blower casing 30 is provided with an air discharge duct 34, in which air of the discharge side of the blower fan 31 flows. As shown in FIGS. 2 and 4, the air discharge duct 34 is disposed at the vehicle front side of the blower casing 30. The air discharge duct 34 includes an upper portion and a lower portion, which are respectively integrated with the upper casing portion 30a and the lower casing portion 30b and fixed to each other by fastening. The air discharge duct 34 is made of the resin, which is the same with the blower casing 30.

Figure 5:
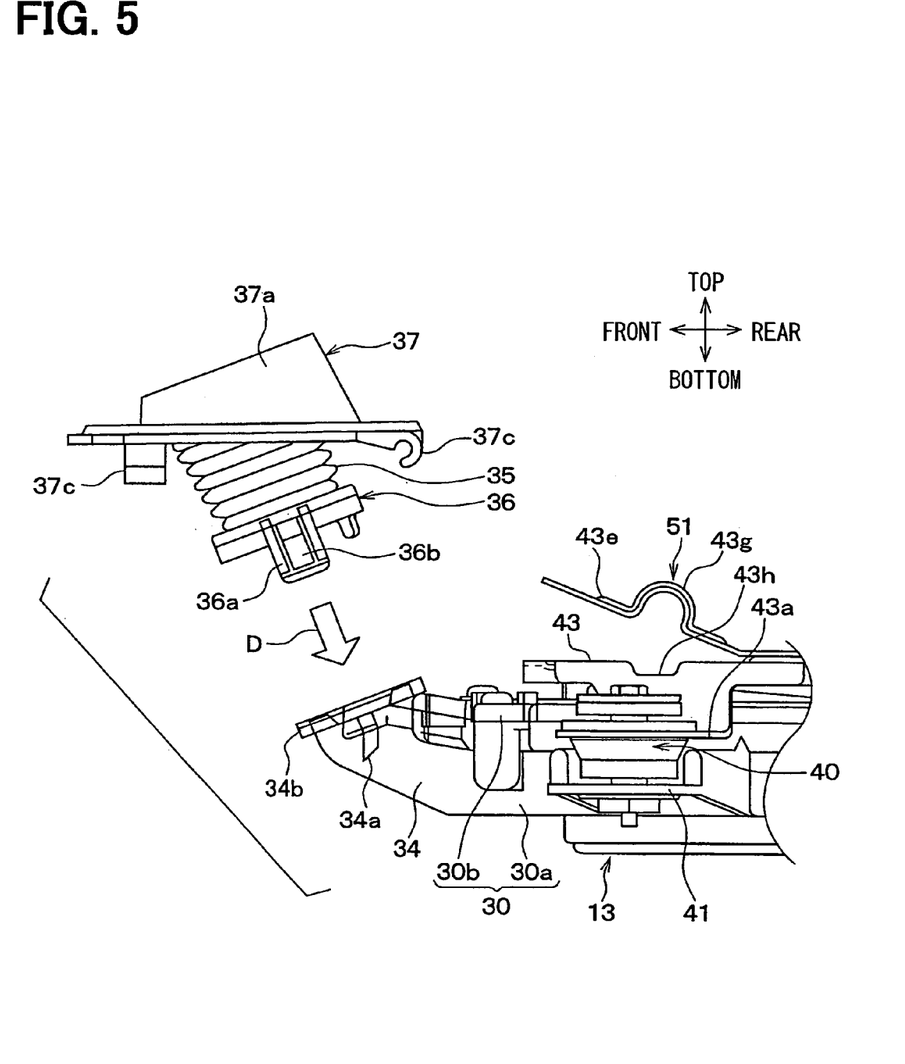
FIG. 5 is a disassembled view showing a joint construction of an accordion duct of the first blower unit according to the preferred embodiment.

The air discharge duct 34 is communicated with the air passage 15 (referring to FIG. 1) through an accordion duct 35, which is made of a rubber or the like. Referring to FIG. 5, a first connector member 36 is fixedly engaged with an outer surface of one end 35a (lower end) of the accordion duct 35. A second connector member 37 is fixedly engaged with an outer surface of the other end 35b (upper end) of the accordion duct 35. The connector member 36, and 37 is made of a material (e.g., resin) having a higher stiffness than the rubber constructing the accordion duct 35. The accordion duct 35 is fixedly engaged with the first and second connector members 36 and portion 37 through the resilient deformation of the rubber.

The first connector member 36 having a substantially ring shape is connected to the air discharge duct 34 through a nail engagement of a female engagement portion 36a (i.e., first engagement portion) with a male engagement portion 34a (i.e., second engagement portion). As shown in FIG. 5, the female engagement portion 36a is integrated with the first connector member 36. The male engagement portion 34a is integrated with the air discharge duct 34.

The female engagement portion 36a has a substantially rectangular frame shape with an opening 36b formed at a substantial center thereof, and protrudes from the first connector member 36 to the side of the air discharge duct 34. Correspondingly, the male engagement portion 34a protrudes outward from an outer surface of an end portion 34b (end portion of vehicle front side) of the air discharge duct 34, and has a nail shape to be capable of being inserted in the opening 36b. In this case, the male engagement portion 34a is formed at the lower portion (which is integrated with lower casing portion 30b) of the air discharge duct 34.

The nail-shaped male engagement portion 34a is engaged with the female engagement portion 36a, so that the first connector member 36 and the accordion duct 35 can be connected to the air discharge duct 34. In this case, because the frame-shaped female engagement portion 36a of the first connector member 36 is to be engaged with the nail-shaped male engagement portion 34a, the first connector member 36 is preferably made of a resin which is resiliently deformable to some degree similar to a polyacetal resin.

As shown in FIG. 4 where the first connector member 36 is connected with the air discharge duct 34, the end portion 35a of the accordion duct 35 is resiliently pressed against the end portion 34b of the air discharge duct 34, so that the accordion duct 35 can be hermetically connected to the air discharge duct 34.

Referring to FIG. 3, the second connector member 37 includes a cylinder portion 37a, into which the other end 35b (upper end) of the accordion duct 35 is fixedly inserted, and an attachment flange portion 37b which is disposed at an lower end (axial end) of the cylinder portion 37a. The cylinder portion 37a and the attachment flange portion 37b are integrally formed. The attachment flange portion 37b has a loop plate shape, and extends from the outer surface of the lower end of the cylinder portion 37a to the circumferentially outer side thereof.

Multiple engagement portions 37c are integrated with the attachment flange portion 37b. The engagement portions 37c are disposed at a bottom surface of the attachment flange portion 37b, and engaged with the seat spring members 28. Thus, the second connector member 37 and the upper portion of the accordion duct 35 can fixed to the seat spring members 28.

Referring to FIG. 2, the cylinder portion 37a of the second connector member 37 is inserted into the lower end opening (inlet) of the air passage 15 formed in the cushion member 27, so that the upper end 35b of the accordion duct 35 is communicated with the air passage 15. That is, the accordion duct 35 is partially inserted in the air passage 15 which is formed in the cushion member 27. Therefore, the distance between the first blower unit 13 and the cushion member 27 can be shortened by the insertion length of the accordion duct 35, thus improving the mounting performance of the first blower unit 13.

In this case, a predetermined gap is arranged between the whole outer surface of the cylinder portion 37a of the second connector member 37 and an inner surface of the inlet of the air passage 15. Thus, the cylinder portion 37a of the cushion unit 37 will not contact the inner surface of the inlet of the air passage 15. That is, the inlet of the air passage 15 is set to accommodate the cushion unit 37 having a large dimension tolerance, to improve the mounting performance.

Referring to FIG. 4, a protrusion portion 37d protrudes from an upper surface of the attachment flange portion 37b of the second connector member 37, and has a cross section with an acute angle shape. The protrusion portion 37d is pressed against a rim of the lower end opening (inlet) of the air passage 15 of the cushion member 27, so that the second connector member 37 (accordion duct 35) can be hermetically connected with the air passage 15.

As shown in FIG. 2, multiple communication openings 15a are arranged in the cushion member 27, and disposed at the upper side of the air passage 15 to communicate the air passage 15 with the surface cover member 16. Thus, air in the air passage 15 can flow toward the blowing-out openings 17 (which are formed at surface cover member 16) through the communication openings 15a.

According to this embodiment, the accordion duct 35 having an accordion shape can restrict the vibration excited by the first blower unit 13 from being transmitted to the seat spring member 28 and the cushion member 27, and absorb the relative displacement (deviation) of the first blower unit 13 with respect to the seat spring member 28 and the cushion member 27 by the expansion and contraction of the accordion duct 35. Moreover, the vibration of the first blower unit 13 due to the deformation of the seat spring members 28, can be also restricted by the accordion duct 35.

Corresponding to the vibration characteristic (including vibration frequency, vibration amplitude and the like) of the first blower unit 13, the accordion duct 35 is made of a rubber with a suitable spring constant and a suitable hardness to absorb the relative displacement by the expansion and contraction thereof and isolate the vibration. Preferably, the accordion duct 35 is made of EPDM (ethylene propylene diene monomer) rubber.

As shown in FIG. 3, multiple (e.g., three) vibration-isolating coupler apparatuses 40 are arranged between the blower casing 30 and the seat spring members 28. Two of the vibration-isolating coupler apparatuses 40 are arranged at the front portion of the first blower unit 13, and respectively disposed at the left side and the right side of the first blower unit 13. One of the vibration-isolating coupler apparatuses 40 is arranged at the rear side of the first blower unit 13, and disposed at the substantial center portion of the first blower unit 13.

Figure 6:
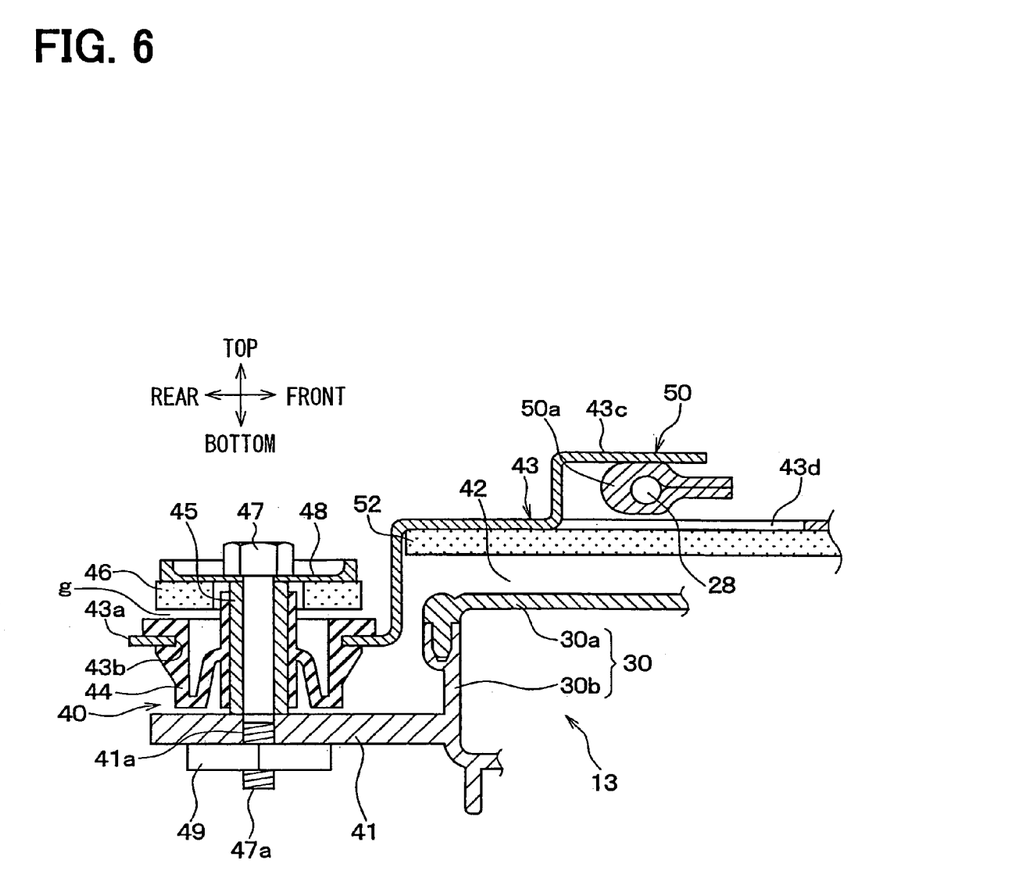
FIG. 6 is a cross-sectional view showing a vibration-isolating support construction of the first blower unit according to the preferred embodiment.

Referring to FIG. 6, each of the vibration-isolating coupler apparatuses 40 has a vibration-isolating rubber member 44 arranged between a first bracket 41 and a second bracket 43. The first bracket 41 and the lower casing portion 30b of the blower casing 30 are integrally formed by the resin. The second bracket 43 is located at the upper side of the blower casing 30 with a predetermined gap 42 therebetween, and extends to the substantially whole upper side of the first blower unit 13, that is, the substantially whole upper side of the blower casing 30.

The first bracket 41 having a plate shape protrudes to the diametrically outer side of the blower casing 30. The first bracket 41 is provided with an attachment hole 41a, which penetrates the first bracket 41 in the thickness direction of the first bracket 41. As shown in FIG. 6, the diametric direction of the blower casing 30 is in the vehicle right-left direction.

The second bracket 43 having a plate shape is formed by pressing, for example. The second bracket 43 is made of a ferrous metal or an aluminum alloy or the like. As shown in FIG. 4, the second bracket 43 is diagonally shaded so that the arrangement range thereof can be distinctly indicated. The second bracket 43 is arranged between the first bracket 41 and the seat spring members 28.

The second bracket 43 is provided with three attachment foot portions 43a corresponding to the three vibration-isolating coupler apparatuses 40. Each of the attachment foot portions 43a is bent to have a "L" shape, and integrated with the second bracket 43. The attachment foot portion 43a protrudes from the second bracket 43, which is disposed at the upper side of the blower casing 30, to the diametrically outer side of the blower casing 30. Referring to FIG. 6, an attachment hole 43a is formed at the substantial center portion of the attachment foot portion 43a. The vibration-isolating rubber member 44 is inserted through the attachment hole 43a.

Figure 7A:
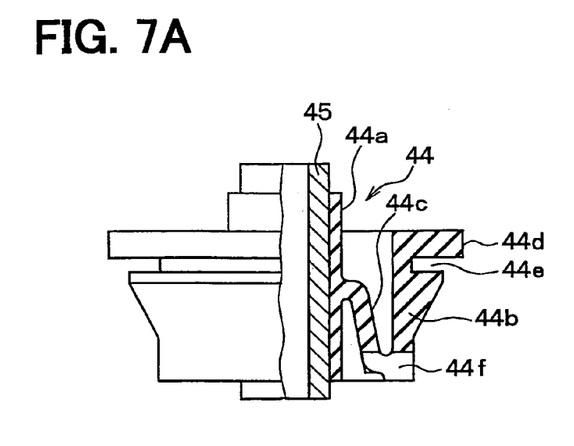
FIG. 7A is a half cross-sectional view showing a vibration-isolating rubber member according to the preferred embodiment.

Referring to FIG. 6 and 7A, the vibration-isolating rubber member 44 having a double-cylinder shape includes an inner cylinder portion 44a, a periphery cylinder portion 44b arranged at the outer side of the inner cylinder portion 44a, and a connection portion 44c, which are integrated with each other. The inner cylinder portion 44a and the periphery cylinder portion 44b are coaxially arranged, and the connection portion 44c is disposed therebetween.

A protrusion portion 44d protrudes from an axial end (upper end) of the periphery cylinder portion 44b, and extends to the diametrically outer side of the periphery cylinder portion 44b. The outer surface (which is disposed below protrusion portion 44d) of the periphery cylinder portion 44b has, for example, a conic surface tapering from the upper end to the lower end thereof. Thus, a ring-shaped groove 44e is formed at the lower side of the protrusion portion 44d. The vibration-isolation rubber member 44 is inserted through the attachment hole 43b of the attachment foot portion 43a, so that the surface of the ring-shaped groove 44e is engaged with the surfaces of the attachment hole 43b and the rim portion of the attachment hole 43b.

An inner surface of the inner cylinder portion 44a is fixedly engaged with an outer surface of a cylindrical metal sleeve 45. The axial dimension of the metal sleeve 45 is larger than that of the inner cylinder portion 44a of the vibration-isolating rubber member 44 by a predetermined value, so that two axial ends (upper end and lower end) of the metal sleeve 45 protrude to the axially outer side of the inner cylinder portion 44a. That is, the two axial ends of the metal sleeve 45 are located at the axially outer side of the inner cylinder portion 44a. The sleeve 45 is provided with a central hole which penetrates the sleeve 45.

As shown in FIG. 6, one of the axial ends (lower end) of the metal sleeve 45 contacts the upper surface of the first bracket 41. The other (upper end) of the axial ends of the metal sleeve 45 is arranged in a central hole of a vibration-isolating member 46 (e.g., packing member).

The vibration-isolating member 46 has a ring plate shape, and is bonded to a bottom surface of a stopper 48 (described later). The vibration-isolating member 46 is made of a resilient material having a smaller rebound elasticity rate than the vibration-isolating rubber member 44. The upper ends of the inner cylinder portion 44a and the metal sleeve 45, which is inserted through the inner cylinder portion 44a, are arranged in the central hole of the vibration-isolating member 46. The central hole penetrates the-vibration-isolating member 46. A predetermined gap g is provided between a bottom surface of the vibration-isolating member 46 and a top surface of the protrusion portion 44d.

In this case, the rebound elasticity rate of a material is determined by dropping a ball with a predetermined weight from a predetermined height to a test object made of the material. The rebound elasticity rate of the material is represented by a proportion (%) of the rebound height of the ball to the predetermined height before it falls. A small rebound elasticity rate of the material means that the material has a low rebound performance. In this case, the resilient material having the smaller rebound elasticity rate than the vibration-isolating rubber member 44 can be a sponge-like porous resin resilient material.

The stopper 48 having a ring plate shape, is a rigid body made of a metal or a resin or the like. The stopper 48 is provided with a central hole and a diameter-enlarged hole, in which a head portion of the bolt 47 is arranged. A foot portion of the bolt 47 is inserted through the central hole of the stopper 48. That is, the stopper 48 is arranged between the other axial end (upper end) of the metal sleeve 45 and the head portion of the bolt 47. The head portion of the bolt 47 is a diameter-enlarged portion compared with the foot portion thereof, and disposed at the upper side of the foot portion.

In this case, the foot portion of the bolt 47 is inserted through the central hole of the stopper 48, the central hole of the metal sleeve 45 and the attachment hole 41a of the first bracket 41. The lower end of the foot portion of the bolt 47 is exposed from the first bracket 41. That is, the lower end of the foot portion is disposed at the lower side of the first bracket 41. The foot portion of the bolt 47 is provided with a male screw which extends to the lower end thereof, so that a nut 49 can be screwed onto the lower end of the foot portion. Thus, the vibration-isolating rubber member 44 and the vibration-isolating member 46 can be fastened and supported between the first bracket 41 and the stopper 48.

Figure 7B:
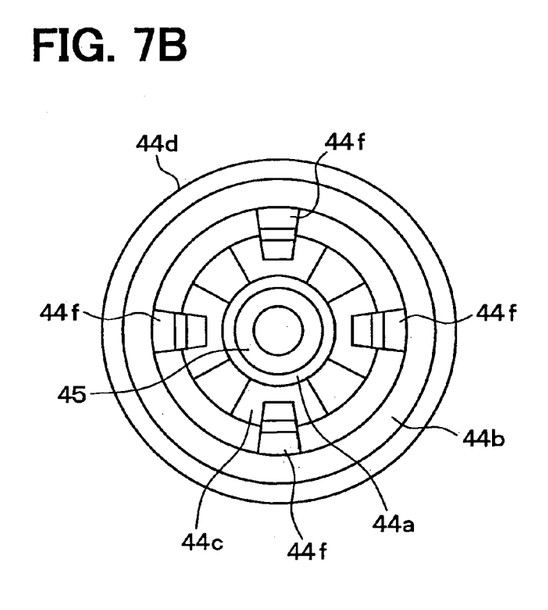
FIG. 7B is a bottom view showing the vibration-isolating rubber member.
Figure 7C:
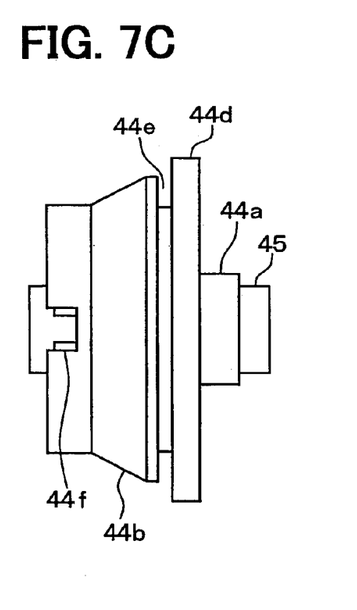
FIG. 7C is a side view showing the vibration-isolating rubber member.

Referring to FIGS. 7A-7C, the vibration-isolating rubber member 44 is provided with four slit portions 44f (i.e., notch portions) at the lower end thereof, which contacts the first bracket 41. Specifically, the slit portion 44f is formed at the lower ends of the periphery cylinder portion 44b and the connection portion 44c. As shown in FIG. 7B, the slit portions 44f are evenly arranged in the circumferential direction of the vibration-isolating rubber member 44. Thus, the spring constant of the vibration-isolating rubber member 44 can be decreased to be substantially in the range from 2 N/m to 8 N/m, for example.

The vibration isolation characteristic of the vibration-isolating rubber member 44 is considerably influenced by the spring constant and the hardness (Hs) thereof. According to this embodiment, the vibration-isolating rubber member 44 provided with the low spring constant has a high vibration-absorbing function corresponding to the vibration frequency band of the first blower unit 13, while the hardness of the vibration-isolating rubber member 44 can be maintained.

In this case, the hardness (Hs) of the vibration-isolating rubber member 44 is set substantially in the rang from a hardness degree of 30 to a hardness degree of 50. The hardness of the vibration-isolating rubber member 44 is determined according to the test method (measurement of load-typed stress deformation) stipulated in "Hardness of Vulcanized Rubber and Thermoplastic Rubber" of JIS K6253.

Multiple vibration-isolating joint arrangements 50 and 51 are provided for the second bracket 43 and the seat spring members 28, 280. For example, as shown in FIG. 3, the two vibration-isolating joint arrangements 50 are respectively provided at the rear right portion and the rear left portion of the first blower unit 13 (blower casing 30). The vibration-isolating joint arrangement 51 is arranged at the front portion of the first blower unit 13, and disposed at the substantial center portion of the vehicle right-left direction of the first blower unit 13.

Referring to FIG. 6, each of the vibration-isolating joint arrangements 50 is provided with a vibration-isolating resilient member 50a. The seat spring member 28 is winded with the vibration-isolating resilient member 50a, which is disposed at the lower side of a spring-retaining protrusion piece 43c.

The spring-retaining protrusion piece 43c is one part of the second bracket 43, which is constructed of a plate metal material. Specifically, the one part of the second bracket 43 is cut to protrude upwardly from the other part (flat portion) thereof and partially separated from the flat portion, to construct the spring-retaining protrusion piece 43c. As shown in FIG. 6, the vehicle front side of the spring-retaining protrusion piece 43c is separated from the flat portion of the second bracket 43.

In this case, the spring-retaining protrusion piece 43c is bended to have a "L" shape. Corresponding to the forming of the spring-retaining protrusion piece 43c, an opening 43d is formed at the second bracket 43 and disposed below the spring-retaining protrusion piece 43c.

The vibration-isolating resilient member 50a is constructed of, for example, a nonwoven fabric or a felt which is made of a resilient intertwined-fiber material with a plate shape, to have a smaller friction coefficient than the rubber.

Referring to FIG. 6, the seat spring member 28 is winded with the plate-shaped vibration-isolating resilient member 50a, which is bended to have a "U" shape and integrally bonded to the seat spring member 28. The upper side of the outer surface of the vibration-isolating resilient member 50a slidably contacts the lower surface of the spring-retaining protrusion piece 43c.

The arrangement arrange (indicated as "A" in FIG. 3) of the vibration-isolating resilient member 50a at the seat spring member 28 is set to be sufficiently larger than the width of the opening 43d. The arrangement arrange "A" (i.e., bond range) is a dimension in the elongated-direction of the seat spring member 28. In this case, the part of the seat spring member 28 which is winded with the vibration-isolating resilient member 50a extends from the right side of the opening 43d to the left side thereof.

Thus, at the position of the vibration-isolating joint arrangement 50, the seat spring member 28 is arranged between the spring-retaining protrusion piece 43c and the second bracket 43 through the vibration-isolating resilient member 50a. That is, the spring-retaining protrusion piece 43c is pressed against the seat spring member 28 with the vibration-isolating member 50a arranged therebetween.

Therefore, the second bracket 43 can be suspended by the seat spring members 28, which respectively support the spring-retaining protrusion pieces 43c at the right and left vibration-isolating joint arrangements 50.

The vibration-isolating joint arrangement 51 is provided at the front portion of the first blower unit 13, and disposed at the substantial center portion of the vehicle right-left direction of the first blower unit 13.

As shown in FIG. 5, at the position of the vibration-isolating joint arrangement 51, a subsidiary bracket 43e made of a metal is provided for the second bracket 43. The subsidiary bracket 43e with an elongated plate shape has a longitudinal direction in the vehicle fore-aft direction. Referring to FIG. 4, a rear end 43f of the subsidiary bracket 43e is fixed to the second bracket 43 by welding, for example.

Referring to FIG. 5, the subsidiary bracket 43e has a bend portion 43g, which is disposed at the substantially center of the longitudinal direction of the subsidiary bracket 43e. The bend portion 43g is concaved upwards to have an arc shape. Correspondingly, the second bracket 43 is provided with a bend portion 43h, which is arranged at the lower side of the arc-shaped bend portion 43g and concaves downwards to have an arc shape. In this case, the bend portions 43g and 43h are arranged to face each other to form a space therebetween, through which the seat spring member 280 winded with a vibration-isolating resilient member 51a (referring to FIG. 4) is inserted.

Similar to the vibration-isolating resilient member 50a for the vibration-isolating joint arrangement 50, the vibration-isolating resilient member 51a is made of a resilient material having a smaller friction coefficient than the rubber. The seat spring member 280 is winded with the vibration-isolating resilient member 51a, which is integrally bonded to the seat spring member 280. The arrangement range (bond range) of the vibration-isolating resilient member 51a at the seat spring member 280 is indicated as "B" in FIG. 3.

Moreover, as shown in FIGS. 4 and 6, a vibration-isolating resilient member 52 (e.g., packing) is fixedly bonded to the whole lower surface (at side of blower casing 30) of the second bracket 43. Similar to the vibration-isolating resilient member 46 of the vibration-isolating coupler apparatus 40, the vibration-isolating resilient member 52 is made of a resilient material having a lower rebound elasticity rate than the rubber.

Next, the attachment method of the first blower unit 13 to the seat spring members 28 and 280 will be described.

In this case, the second bracket 43 is beforehand attached to the first blower unit 13 through the three vibration-isolating coupler apparatuses 40. On the other hand, the part (indicated as "A" in FIG. 3) of the seat spring member 28 is winded with the vibration-isolating resilient member 50a, which is bonded to the seat spring member 28. Similarly, the part (indicated as "B" in FIG. 3) of the seat spring member 280 is winded with the vibration-isolating resilient member 51a, which is bonded to the seat spring member 280. In this case, the subsidiary bracket 43e is set in an upward open state (as indicated by two-point chain line in FIG. 4), with respect to the second bracket 43.

Thereafter, referring to FIG. 3, the whole first blower unit 13 is moved from the right side (vehicle rear side) of the seat spring members 28 and 280 toward the left side (vehicle front side) thereof, so that the seat spring member 28 in the range "A" is engaged with the spring-retaining protrusion pieces 43c of the second bracket 43. Thus, the vibration-isolating resilient member 50a around the seat spring member 28 is pressed against the lower surface of the spring-retaining protrusion piece 43c. The seat spring member 28 slideably contacts the spring-retaining protrusion piece 43c, which is disposed at the upper side of the opening 43d of the second bracket 43 and arranged substantially between the left side surface and the right side surface of the opening 43d.

In this case, the bend portion 43g of the subsidiary bracket 43e and the bend portion 43h of the second bracket 43 are positioned at the part "B" of the seat spring member 280.

Then, referring to FIG. 4, the subsidiary bracket 43e is rotated downwards as shown by the arrow "C", to contact the second bracket 43. Thus, the subsidiary bracket 43e becomes in a closed state with respect to the second bracket 43. Then, the subsidiary bracket 43e is fastened to the second bracket 43 by screwing through a bolt 53, for example.

Thus, the part "B" of the seat spring member 280 which is winded with the vibration-isolating resilient member 51a is pressed against the bend portion 43g of the subsidiary bracket 43e. The seat spring member 280 is slidably arranged between the bend portion 43g of the subsidiary bracket 43e and the bend portion 43h of the second bracket 43.

Thereafter, the female engagement portion 36a of the accordion duct 35 is engaged with the male engagement portion 34a of the air discharge duct 34, as shown by the arrow "D" in FIG. 5. Thus, the accordion duct 35 is connected to the air discharge duct 34.

FIG. 4 shows the first blower unit 13 which is detached from the seat spring members 28 and 280. In the case where the first blower unit 13 is attached to the seat spring members 28 and 280, the first blower unit 13 is to be suspended by the seat spring members 28 and 280 through the three vibration-isolating coupler apparatuses 40, the second bracket 43 and the vibration-isolating resilient members 50a and 51a.

When the first blower unit 13 is mounted at the seat 10, the first blower unit 13 will be lowered due to the self weight thereof. Thus, a predetermined gap is to be formed between the upper surface of the first blower unit 13 and the second bracket 43. Referring to FIG. 4, an arc-shaped bend portion 33e that concaves downward is formed at the attachment flange 33d corresponding to the position of the arc-shaped bend portion 43h (which concaves downward) of the second bracket 43, so that a predetermined gap is formed therebetween.

Next, the effects of the seat air conditioner according to this embodiment will be described.

In this embodiment, the seat spring member 28 is arranged between the first blower unit 13 and the cushion member 27. The first bracket 41 of the blower casing 30 of the first blower unit 13 is connected to the seat spring members 28 and 280 through the multiple vibration-isolating coupler apparatuses 40, the second bracket 43 and the multiple vibration-isolating joint arrangements 50 and 51.

Accordingly, the first blower unit 13 is suspended and supported by the seat spring members 28 and 280. In this case, the first blower unit 13 which is a rigid body is not positioned inside the cushion member 27, thus improving the comfortableness of the seat 10.

Moreover, because the first blower unit 13 is supported by the seat spring members 28 and 280, the first blower unit 13 can be displaced responding to the resilient deformation of the seat spring members 28 and 280 when the passenger sits on the seat 10. Therefore, the first blower unit 13 can be protected from an impact due to a seating of the passenger. Thus, a failure of the first blower unit 13 can be restricted.

Furthermore, the vibration-isolating rubber member 44 of the vibration-isolating coupler apparatus 40 is intervened in the support structure of the first blower unit 13. The spring constant, the hardness and the like of the vibration-isolating rubber member 44 can be suitably set to have the satisfactory vibration-absorbing function in the frequency band of the vibration excited by the first blower unit 13. Thus, the vibration of the first blower unit 13 can be substantially restricted from being transmitted to the cushion member 27.

Moreover, the air discharge duct 34 of the first blower unit 13 is communicated with the air passage 15 in the cushion member 27 through the accordion duct 35, which is made of the rubber to be capable of satisfactorily absorbing vibration. Therefore, the vibration of the first blower unit 13 can be substantially restricted from being transmitted to the cushion member 27 through the seat spring members 28 and 280.

According to this embodiment, as shown in FIG. 2, a sufficient gap is maintained between the cushion member 27 and the spring-retaining protrusion piece 43c, which is disposed at the upper side of the seat spring members 28 and 280. Moreover, a sufficient gap is maintained between the cushion member 27 and the subsidiary bracket 43e which is disposed at the upper side of the seat spring members 28 and 280. Therefore, a direct vibration transmission from the second bracket 43 to the cushion member 27 can be restricted.

According to this embodiment, the vibration-isolating joint arrangements 50 and 51 which directly contact the seat spring members 28 and 280 are respectively provided with the vibration-isolation resilient members 50a and 51a, each of which is made of the resilient material (e.g., felt) having the smaller friction coefficient than the rubber. Therefore, the attrition wear of the vibration-isolation resilient members 50a and 51a can be reduced, even when the seat spring members 28 and 280 are frequently deformed. Thus, the vibration-isolation resilient members 50a and 51a can be restricted from becoming worn-out during a short period.

Moreover, according to this embodiment, the slit portions 44f (notch portions) are provided for the vibration-isolation rubber member 44, so that the, spring constant of the vibration-isolating rubber member 44 can be lowered. Therefore, the vibration-isolation rubber member 44 can be provided with a high vibration-absorbing function in the frequency band of the vibration excited by the first blower unit 13, while the hardness (Hs) of the vibration-isolation rubber member 44 made of the rubber can be maintained.

Accordingly, the worsening of the vibration-isolating function of the vibration-isolation rubber member 44 due to the rubber age deterioration (e.g., reduction of oil contained therein) can be restricted.

Moreover, according to this embodiment, the accordion duct 35 having the accordion shape is capable of stretching and contracting, so that the relative displacement of the first blower unit 13 with respect to the cushion member 27, the seat spring members 28 and 280 can be substantially absorbed.

Furthermore, the vibration-isolating coupler apparatus 40 is provided with the vibration-isolating member 46 having the smaller rebound elasticity rate than the vibration-isolating rubber member 44. The vibration-isolating resilient member 52 having the smaller rebound elasticity rate than the rubber is arranged at the lower side of the second bracket 43. Therefore, the vibration of the first blower unit 13 from the side of the seat 10 can be restricted by the vibration-isolating members 46 and 52.

Referring to FIG. 6, when the first blower unit 13 is displaced upward due to the vibration from the side of the seat 10, the vibration-isolating resilient member 52 which is arranged at the lower side of the second bracket 43 will be contracted. Thus, the vibration and impact of the first blower unit 13 can be substantially absorbed.

On the contrary, when the first blower unit 13 is displaced downward due to the vibration from the side of the seat 10, the vibration-isolating member 46 which is arranged at the lower side of the stopper 48 will be contracted between the stopper 48 and the vibration-isolating rubber member 44. Thus, the vibration and impact of the first blower unit 13 can be substantially absorbed.

Accordingly, the vibration load exerted at circuit components and bearings of the motor 33 can be reduced. Therefore, the damage of the devices of the first blower unit 13 due to the vibration from the side of the seat 10 can be restricted.

Other Embodiment

Although the present invention has been fully described in connection with the preferred embodiments thereof with reference to the accompanying drawings, it is to be noted that various changes and modifications will become apparent to those skilled in the art.

In the above-described preferred embodiment, each of the seat spring members 28 and 280 is a wire spring. However, each of the seat spring members 28 and 280 can also be a bread-shaped plate spring. In this case, the second bracket 43 is connected to the seat spring members 28 and 280 through the vibration-isolating resilient members 50a and 51a.

Moreover, in the preferred embodiment, the electric heaters 22 and 23 are used as the heating units in the vehicle seat air conditioner, which is not provided with a cooling unit. However, the seat air conditioner can be also provided with the cooling unit such as a Peltier device, which can be attached to the second connector member 37. The second connector member 37 is fixedly engaged with the end portion of the accordion duct 35.

Thus, in a cooling operation in summer, cool air cooled by the Peltier device can be blown out through the blowing-out openings 17 and 20, which are respectively formed at the surface cover members 16 and 19 of the seat 10. Therefore, the cool feeling of the passenger can be improved.

Moreover, in the preferred embodiment, one of the first blower unit 13 and the second blower unit 14 draws air in the passenger compartment, and blows it to the air passages 15 and 16 formed in the seat 10. However, the air intake ports of the first blower unit 13 and the second blower unit 14 can be also connected with a conditioned-air discharge port of the passenger-compartment air conditioning unit 21 through ducts. Thus, conditioned air (including cool air and warm air) having been temperature-conditioned in the air conditioning unit 21 can be drawn into the first blower unit 13 and the second blower unit 14, and blown to the air passages 15 and 18 in the seat 10.

Furthermore, in the preferred embodiment, the mounting construction of the first blower unit 13 which is attached to the seat cushion unit 11 is provided. However, this mounting construction can be also correspondingly used for the second blower unit 14 which is mounted at the seat back unit 12.

Such changes and modifications are to be understood as being in the scope of the present invention as defined by the appended claims.

What is claimed is:

1. A seat air conditioner for a vehicle seat, which has a cushion member disposed at a backside of a surface cover member and resiliently supported by a plurality of seat spring members at a backside of the cushion member, the seat air conditioner comprising:
    a blower unit including a blower fan and an air discharge duct, through which air blown by the blower fan flows, the blower unit being disposed at an opposite side to the cushion member with respect to the seat spring members of the vehicle seat;
    a vibration isolation unit which is arranged between the blower unit and the cushion member; and
    an accordion duct which is arranged at a joint between the air discharge duct and an air passage defined in the cushion member, the accordion duct being made of a rubber, wherein
    air in the air discharge duct flows through the accordion duct and the air passage toward a plurality of blowing-out openings formed at the surface cover member of the vehicle seat;
    at least a part of the accordion duct which is resiliently deformable in a duct axis direction protrudes out of the air passage toward a side of the blower unit;
    a first end of the accordion duct is fixed to the seat spring members;
    the accordion duct is partially disposed in the air passage formed in the cushion member;
    the accordion duct has a first connector member which is fixed to an outer surface of a second end of the accordion duct, and a second connector member which is fixed to an outer surface of the first end of the accordion duct;
    the first connector member is connected with the air discharge duct;
    the second connector member includes a cylinder portion, in which the first end of the accordion duct is fixedly inserted, and an attachment flange portion which is integrated with an axial end of the cylinder portion, the axial end of the cylinder portion being at a side of the blower unit; and
    the cylinder portion of the second connector member is inserted in the air passage formed in the cushion member, so that the first end of the accordion duct is communicated with the air passage.

2. The seat air conditioner according to claim 1, wherein:
    the second connector member is provided with a protrusion portion, which is disposed at a surface of the attachment flange portion and has a cross section with an acute angle shape, the surface of the attachment flange portion being at a side of the cushion member; and
    the protrusion portion is pressed against a rim of an opening of the air passage formed in the cushion member, so that the second connector member is hermetically connected with the air passage.

3. A seat air conditioner for a vehicle seat, which has a cushion member disposed at a backside of a surface cover member and resiliently supported by a plurality of seat spring members at a backside of the cushion member, the seat air conditioner comprising:
    a blower unit including a blower fan and an air discharge duct, through which air blown by the blower fan flows, the blower unit being disposed at an opposite side to the cushion member with respect to the seat spring members of the vehicle seat;
    a vibration isolation unit which is arranged between the blower unit and the cushion member; and
    an accordion duct which is arranged at a joint between the air discharge duct and an air passage defined in the cushion member, the accordion duct being made of a rubber, wherein
    air in the air discharge duct flows through the accordion duct and the air passage toward a plurality of blowing-out openings formed at the surface cover member of the vehicle seat;
    at least a part of the accordion duct which is resiliently deformable in a duct axis direction protrudes out of the air passage toward a side of the blower unit;
    a first end of the accordion duct is fixed to the seat spring members;
    the blower unit further includes a blower casing for rotatably accommodating the blower fan, a first bracket which is joined to the blower casing, and a second bracket which is arranged between the first bracket and the seat spring members;
    the vibration isolation unit includes a plurality of vibration-isolating resilient members, each of which is arranged between the second bracket and the seat spring member, and a plurality of vibration-isolating coupler apparatuses, each of which has a vibration-isolating rubber member arranged between the first bracket and the second bracket;
    the vibration-isolating resilient member is made of a resilient material having a smaller friction coefficient than a rubber; and
    the vibration-isolating rubber member is provided with a plurality of slit portions so that a spring constant of the vibration-isolating rubber member is deceased.

4. A seat air conditioner for a vehicle seat, which has a cushion member disposed at a backside of a surface cover member and resiliently supported by a plurality of seat spring members at a backside of the cushion member, the seat air conditioner comprising:
    a blower unit including a blower fan and an air discharge duct, through which air blown by the blower fan flows, the blower unit being disposed at an opposite side to the cushion member with respect to the seat spring members of the vehicle seat;
    a vibration isolation unit which is arranged between the blower unit and the cushion member; and
    an accordion duct which is arranged at a joint between the air discharge duct and an air passage defined in the cushion member, the accordion duct being made of a rubber, wherein
    air in the air discharge duct flows through the accordion duct and the air passage toward a plurality of blowing-out openings formed at the surface cover member of the vehicle seat;
    at least a part of the accordion duct which is resiliently deformable in a duct axis direction protrudes out of the air passage toward a side of the blower unit;
    a first end of the accordion duct is fixed to the seat spring members;
    the blower unit further includes a blower casing for rotatably accommodating the blower fan, a first bracket which is joined to the blower casing, and a second bracket which is arranged between the first bracket and the seat spring members;

the vibration isolation unit includes a plurality of vibration-isolating resilient members, each of which is arranged between the second bracket and the seat spring member, and a plurality of vibration-isolating coupler apparatuses, each of which has a vibration-isolating rubber member arranged between the first bracket and the second bracket;

the vibration-isolating resilient member is made of a resilient material having a smaller friction coefficient than a rubber; and the vibration-isolating coupler apparatus further has a vibration-isolating member, which is made of a resilient material having a smaller rebound elasticity rate than the vibration-isolating rubber member of the vibration-isolating coupler apparatus.

5. The seat air conditioner according to claim 4, wherein the vibration-isolating member is made of a porous resin resilient material.

6. A seat air conditioner for a vehicle seat, which has a cushion member disposed at a backside of a surface cover member and resiliently supported by a plurality of seat spring members at a backside of the cushion member, the seat air conditioner comprising:

a blower unit including a blower fan and an air discharge duct, through which air blown by the blower fan flows, the blower unit being disposed at an opposite side to the cushion member with respect to the seat spring members of the vehicle seat;

a vibration isolation unit which is arranged between the blower unit and the cushion member; and an accordion duct which is arranged at a joint between the air discharge duct and an air passage defined in the cushion member, the accordion duct being made of a rubber; wherein air in the air discharge duct flows through the accordion duct and the air passage toward a plurality of blowing-out openings formed at the surface cover member of the vehicle seat;

the accordion duct is partially disposed in the air passage formed in the cushion member;

the accordion duct has a first connector member which is fixed to an outer surface of one end of the accordion duct, and a second connector member which is fixed to an outer surface of the other end of the accordion duct;

the first connector member is connected with the air discharge duct;

the second connector member includes a cylinder portion, in which the other end of the accordion duct is fixedly inserted, and an attachment flange portion which is integrated with an axial end of the cylinder portion, the axial end of the cylinder portion being at a side of the blower unit; and the cylinder portion of the second connector member is inserted in the air passage formed in the cushion member, so that the other end of the accordion duct is communicated with the air passage.

7. The seat air conditioner according to claim 6, wherein:

the second connector member is provided with a protrusion portion, which is disposed at a surface of the attachment flange portion and has a cross section with an acute angle shape, the surface of the attachment flange portion being at a side of the cushion member; and the protrusion portion is pressed against a rim of an opening of the air passage formed in the cushion member, so that the second connector member is hermetically connected with the air passage.

8. A seat air conditioner for a vehicle seat, which has a cushion member disposed at a backside of a surface cover member and resiliently supported by a plurality of seat spring members at a backside of the cushion member, the seat air conditioner comprising:

a blower unit including a blower fan and an air discharge duct, through which air blown by the blower fan flows, the blower unit being disposed at an opposite side to the cushion member with respect to the seat spring members of the vehicle seat;

a vibration isolation unit which is arranged between the blower unit and the cushion member; and an accordion duct which is arranged at a joint between the air discharge duct and an air passage defined in the cushion member, the accordion duct being made of a rubber; wherein air in the air discharge duct flows through the accordion duct and the air passage toward a plurality of blowing-out openings formed at the surface cover member of the vehicle seat;

the blower unit further includes a blower casing for rotatably accommodating the blower fan, a first bracket which is joined to the blower casing, and a second bracket which is arranged between the first bracket and the seat spring members;

the vibration isolation unit includes a plurality of vibration-isolating resilient members, each of which is arranged between the second bracket and the seat spring member, and a plurality of vibration-isolating coupler apparatuses, each of which has a vibration-isolating rubber member arranged between the first bracket and the second bracket;

the vibration-isolating resilient member is made of a resilient material having a smaller friction coefficient than a rubber; and the vibration-isolating rubber member is provided with a plurality of slit portions so that a spring constant of the vibration-isolating rubber member is decreased.

9. A seat air conditioner for a vehicle seat, which has a cushion member disposed at a backside of a surface cover member and resiliently supported by a plurality of seat spring members at a backside of the cushion member, the seat air conditioner comprising:

a blower unit including a blower fan and an air discharge duct, through which air blown by the blower fan flows, the blower unit being disposed at an opposite side to the cushion member with respect to the seat spring members of the vehicle seat;

a vibration isolation unit which is arranged between the blower unit and the cushion member; and an accordion duct which is arranged at a joint between the air discharge duct and an air passage defined in the cushion member, the accordion duct being made of a rubber; wherein air in the air discharge duct flows through the accordion duct and the air passage toward a plurality of blowing-out openings formed at the surface cover member of the vehicle seat;

the blower unit further includes a blower casing for rotatably accommodating the blower fan, a first bracket which is joined to the blower casing, and a second bracket which is arranged between the first bracket and the seat spring members;

the vibration isolation unit includes a plurality of vibration-isolating resilient members, each of which is arranged between the second bracket and the seat spring member, and a plurality of vibration-isolating coupler apparatuses, each of which has a vibration-isolating rubber member arranged between the first bracket and the second bracket;

the vibration-isolating resilient member is made of a resilient material having a smaller friction coefficient than a rubber; and the vibration-isolating coupler apparatus further has a vibration-isolating member, which is made of a resilient material having a smaller rebound elasticity rate than the vibration-isolating rubber member of the vibration-isolating coupler apparatus.

10. The seat air conditioner according to claim 9, wherein the vibration-isolating member is made of a porous resin resilient material.

11. A seat air conditioner for a vehicle seat, which has a cushion member disposed at a backside of a surface cover member and resiliently supported by a plurality of seat spring members at a backside of the cushion member, the seat air conditioner comprising:

a blower unit which includes a blower fan for blowing air, a blower casing for rotatably accommodating the blower fan, a first bracket joined to the blower casing, and a second bracket arranged between the first bracket and the seat spring members of the vehicle seat;

the blower unit being disposed at an opposite side to the cushion member with respect to the seat spring members;

a plurality of vibration-isolating coupler apparatuses, each of which has a vibration-isolating rubber member arranged between the first bracket and the second bracket; and a plurality of vibration-isolating resilient members, each of which is arranged between the second bracket and a respective seat spring member, wherein:

the blower fan blows air through an air passage defined in the cushion member toward a plurality of blowing-out openings formed at the surface cover member of the vehicle seat;

each of the plurality of vibration-isolating resilient members is made of a resilient material having a smaller friction coefficient than a rubber; and the vibration-isolating rubber member includes an inner cylinder portion, a periphery cylinder portion which is arranged at a radially outer side of the inner cylinder portion, and a connection portion which integrally connects the inner cylinder portion with the periphery cylinder portion.

12. The seat air conditioner according to claim 11, wherein:

the vibration-isolating rubber member is provided with a plurality of slit portions, which are formed at lower ends of the periphery cylinder portion and the connection portion.

* * * * *